US011696201B2

United States Patent
Gu et al.

(10) Patent No.: US 11,696,201 B2
(45) Date of Patent: Jul. 4, 2023

(54) METHOD, DEVICE AND COMPUTER-READABLE MEDIUM FOR GUARANTEEING COMMUNICATION SERVICE

(71) Applicant: Alcatel Lucent, Nozay (FR)

(72) Inventors: Junrong Gu, Shanghai (CN); Xiaobing Leng, Shanghai (CN); Dawei Wang, Shanghai (CN); Dongyao Wang, Shanghai (CN); Jun Wang, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 16/650,250

(22) PCT Filed: Sep. 25, 2018

(86) PCT No.: PCT/IB2018/001207
§ 371 (c)(1),
(2) Date: Mar. 24, 2020

(87) PCT Pub. No.: WO2019/064074
PCT Pub. Date: Apr. 4, 2019

(65) Prior Publication Data
US 2021/0204187 A1    Jul. 1, 2021

(30) Foreign Application Priority Data
Sep. 26, 2017  (CN) .......................... 201710884762.6

(51) Int. Cl.
*H04W 36/26* (2009.01)
*H04W 28/06* (2009.01)
*H04W 36/00* (2009.01)

(52) U.S. Cl.
CPC ........... *H04W 36/26* (2013.01); *H04W 28/06* (2013.01); *H04W 36/0083* (2013.01)

(58) Field of Classification Search
CPC ... H04W 8/08; H04W 28/06; H04W 36/0083; H04W 36/26; H04W 16/04;
(Continued)

(56) References Cited

U.S. PATENT DOCUMENTS

| 9,398,508 | B1 * | 7/2016 | Velusamy ......... H04W 36/0061 |
| 2012/0142387 | A1 * | 6/2012 | Kano ................ H04W 36/0016 455/509 |

(Continued)

FOREIGN PATENT DOCUMENTS

| CN | 106572516 A | 4/2017 |
| GB | 2 558 585 A | 7/2018 |

(Continued)

OTHER PUBLICATIONS

ZTE, "Consideration on RAN Side Network Slicing", R3-160821, 3GPP TSG RAN WG3 Meeting#91bis, Apr. 11-15, 2016 (Year: 2016).*

(Continued)

*Primary Examiner* — Khoa Huynh
(74) *Attorney, Agent, or Firm* — Lippes Mathias LLP

(57) ABSTRACT

Embodiments of the present disclosure relate to a method, a device and a computer-readable medium for guaranteeing communication service. According to embodiments of the present disclosure, a source network device that currently serves the terminal device transmits, to a target network device which will serve the terminal device, information about the amount of resources of network slices utilized by the terminal device. The target network device configures the amount of resources based on the information. In this way, successful handover of the terminal device from the source network device to the target network device is guaranteed, so as to ensure continuity of communication services of the terminal device. In addition, embodiments of (Continued)

the present disclosure creates a network slice in the target network device, which avoids possible interruptions of communication service caused by mapping from the terminal device to the slices supported by the target network device.

4 Claims, 7 Drawing Sheets

(58) Field of Classification Search
CPC ......... H04W 36/0005; H04W 36/0072; H04W 36/28; H04W 36/32; H04W 72/0406; H04W 72/0413; H04W 72/0493
See application file for complete search history.

(56) References Cited

U.S. PATENT DOCUMENTS

| | | | |
|---|---|---|---|
| 2014/0198761 A1 | 6/2014 | Hooli et al. | |
| 2017/0079059 A1* | 3/2017 | Li | H04W 16/02 |
| 2017/0086118 A1* | 3/2017 | Vrzic | H04W 36/26 |
| 2018/0007587 A1* | 1/2018 | Feldman | H04L 65/1073 |
| 2019/0306761 A1* | 10/2019 | Jin | H04W 76/22 |

FOREIGN PATENT DOCUMENTS

| | | | | |
|---|---|---|---|---|
| KR | 2018 0049796 A | 5/2018 | | |
| WO | WO 2017/074486 A1 | 5/2017 | | |
| WO | WO 2018/084593 A1 | 5/2018 | | |
| WO | WO-2018215076 A1 * | 11/2018 | ........ | H04W 36/0016 |

OTHER PUBLICATIONS

ZTE, "Consideration on RAN Side Network Slicing", R3-160821, 3GPP TSG RAN WG3 Meeting#9 bis, Apr. 11-15, 2016 (Year: 2016).*

ITRI, "Context awareness enhancement for mobility", R2-168055, 3GPP TSG-RAN WG2 Meeting #96, Nov. 14-18, 2016. (Year: 2016).*

LG Electronics Inc., "Considering slice related information during mobility," $3^{rd}$ Generation Partnership Project (3GPP), 3GPP TSG-RAN WG3 Meeting #97, R3-173197, XP051320028, 12 pages, Berlin, Germany, Aug. 21-25, 2017.

ITRI, "RAN Slicing in NR," $3^{rd}$ Generation Partnership Project (3GPP), 3GPP TSG RAN WG2 NR Ad Hoc, R2-1700262, XP051210844, pp. 1-5, Spokane, USA, Jan. 17-19, 2017.

LG Electronics Inc., "TP for considering slice related information during Xn-based handover for 38.423," $3^{rd}$ Generation Partnership Project (3GPP), 3GPP TSG-RAN WG3 Meeting # NR AdHoc, R3-172566, XP051302505, 4 pages, Qingdao, P. R. China, Jun. 27-29, 2017.

Huawei, "Xn based mobility," $3^{rd}$ Generation Partnership Project (3GPP), 3GPP TSG-RAN3 Meeting AH-1801, R3-180473, XP051387318, 4 pages, Sophia Antipolis, France, Jan. 22-26, 2018.

Itri, "Context awareness enhancement for mobility," $3^{rd}$ Generation Partnership Project (3GPP), 3GPP TSG-RAN WG2 Meeting #96, R2-168055, XP051177753, 2 pages, Reno, USA, Nov. 14-18, 2016.

"$3^{rd}$ Generation Partnership Project; Technical Specification Group Radio Access Network; Study on New Radio Access Technology; Radio Access Architecture and Interfaces (Release 14)," 3GPP TR 38.801 V0.4.0, pp. 1-36, XP051172437, Aug. 2016.

International Search Report for PCT/IB2018/001207 dated Mar. 4, 2019.

ZTE, "Consideration on RAN Side Network Slicing," $3^{rd}$ Generation Partnership Project (3GPP), 3GPP TSG RAN WG3 Meeting#91bis, R3-160821, 9 pages, Bangalore, India, Apr. 11-15, 2016.

Nokia et al., "Connected mode mobility with slicing," $3^{rd}$ Generation Partnership Project (3GPP), 3GPP TSG RAN WG3#95bis, R3-171116, XP051245836, pp. 1-4, Spokane, USA, Apr. 3-7, 2017.

Huawei, R3-172486, 3GPP TSG-RAN WG3 Meeting #AH, Qingdao, China, Jun. 27-29, 2017, XP 51307760A, 3 pages.

* cited by examiner

METHOD, DEVICE AND COMPUTER-READABLE MEDIUM FOR GUARANTEEING COMMUNICATION SERVICE

FIELD

Embodiments of the present disclosure generally relate to the field of communication technology, and more specifically, to a method, a device and a computer-readable medium for guaranteeing communication services.

BACKGROUND

An amount of traffic of communications is increasing dramatically with the development of communication technologies. To deal with the growing communication traffic, the third Generation Partnership Project (3GPP) has proposed fifth mobile communication standards. The International Communication Union defines typical scenarios of the fifth mobile communication standard as: Enhanced Mobile Broadband (eMBB), Massive Machine-Type Communication (mMTC) and Ultra Reliable & Low Latency Communication (uRLLC). Different types of application scenarios have different demands in billing, security, latency and reliability among other aspects. In order to add flexibility in architecture of the communication network, a concept of Network Slicing of wireless access networks of the fifth mobile communication is introduced. The network slicing includes deploying a plurality of end-to-end logical networks to support operations of independent business.

SUMMARY

In general, embodiments of the present disclosure relate to guaranteeing communication service and corresponding terminal devices.

In a first aspect, embodiments of the present disclosure provide a method for guaranteeing communication service. The method comprises: determining, based on communication condition of at least one terminal device served by the first network device, a amount of resources of network slices utilized by the first network device, one network slice being associated with a group of network functions; determining, based on at least one of movement and service request of the at least one terminal device, a second network device which will serve the at least one terminal device; and sending to the second network device an indication of the amount of resources.

In a second aspect, embodiments of the present disclosure provide a method for guaranteeing communication service. The method comprises: receiving from a first network device an indication of an amount of resources of a first network slice utilized by the first network device, one network slice being associated with a group of network functions; and configuring, based on the indication, resources of a first network slice utilized by the second network device.

In a third aspect, embodiments of the present disclosure provide a network device. The network device comprises: at least one processor; and a memory coupled to the at least one processor and stored with instructions therein, the instructions, when executed by the at least one processor, causing the network device to perform actions. The actions comprise: determining, based on communication condition of at least one terminal device served by the first network device, an amount of resources of network slices utilized by the first network device, one network slice being associated with a group of network functions; determining, based on at least one of movement and service request of the at least one terminal device, a second network device which will serve the at least one terminal device; and sending to the second network device an indication of the amount of resources.

In a fourth aspect, embodiments of the present disclosure provide a network device. The network device comprises: at least one processor; and a memory coupled to the at least one processor and stored with instructions therein, the instructions, when executed by the at least one processor, causing the network device to perform actions. The actions comprise: receiving from a first network device an indication of an amount of resources of a first network slice utilized by the first network device, one network slice being associated with a group of network functions; and configuring, based on the indication, resources of a first network slice utilized by the second network device.

In a fifth aspect, embodiments of the present disclosure provide a computer-readable medium. The computer-readable medium includes program codes stored thereon, which program codes, when executed by an apparatus, causing the apparatus to perform the method according to the first aspect or the second aspect.

It should be appreciated that the contents described in this Summary are not intended to identify key or essential features of the embodiments of the present disclosure, or limit the scope of the present disclosure. Other features of the present disclosure will be understood more easily through the following description.

BRIEF DESCRIPTION OF THE DRAWINGS

The above and other objectives, features, and advantages of example embodiments of the present disclosure will become more apparent, through the following detailed description with reference to the accompanying drawings in which.

Throughout the drawings, the same or similar reference symbols refer to the same or similar elements.

DETAILED DESCRIPTION OF EMBODIMENTS

Figure 1:
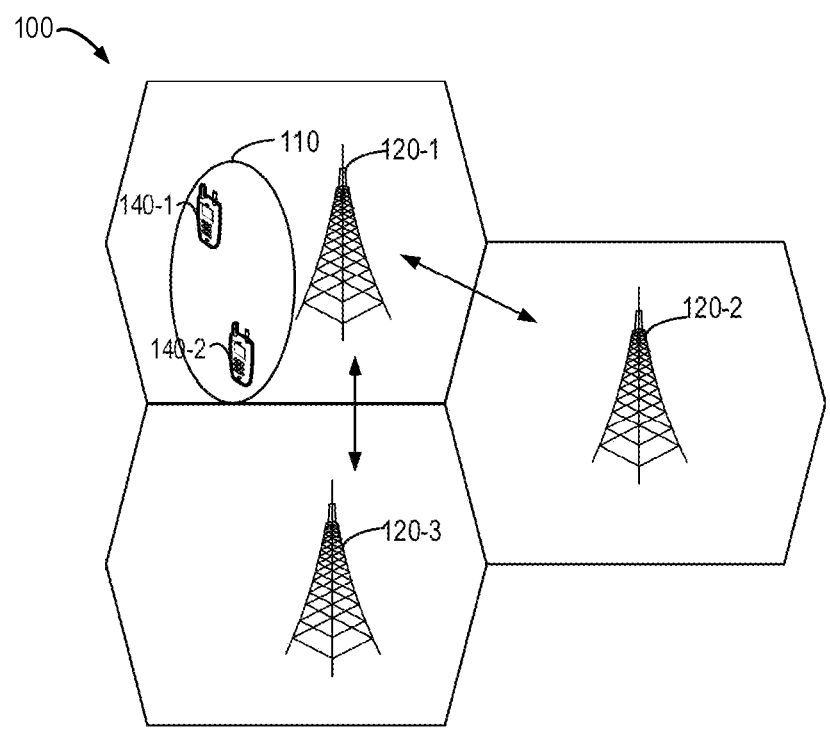
FIG. 1 illustrates a block diagram of an example communication system where embodiments of the present disclosure may be implemented.

Embodiments of the present disclosure will be described in more details with reference to the drawings. Although some embodiments of the present disclosure are illustrated in the drawings, it would be appreciated that the present disclosure may be implemented in various manners but not be limited to embodiments as described herein. By contrast, these embodiments are provided to understand the present disclosure more thoroughly and completely. It is to be understood that the drawings and embodiments of the present disclosure are provided only as examples and is not intended for limiting the scope disclosed herein in any manner.

The term "network device" used herein refers to any suitable entities or devices that can provide cells or coverage, through which the terminal devices can access the network or receive services. Examples of the network device, for example, include a base station. The term "base station" (BS) used herein can represent a node B (NodeB or NB), an evolution node B (eNode B or eNB), a remote radio unit (RRU), a radio frequency head (RH), a remote radio head (RRH), a relay, or low power nodes, such as pico base station or femto base station and so on.

The term "terminal device" or "user equipment" (UE) used herein refers to any entities or devices that can wirelessly communicate with the network devices or with each other. For example, the terminal device can include a mobile terminal (MT), a subscriber station (SS), a portable subscriber station (PSS), a mobile station (MS) or an access terminal (AT), the above devices mounted on vehicles, and machines or electric appliances having communication functions etc.

The term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Other definitions, explicit and implicit, may be included below.

The term "network slicing" used herein is known for those skilled in the art and represents a set of network functions and resources for operating the network functions. They form a complete and instantiated logical network and satisfy particular network characteristics required by service examples. One network slice may be separated, completely or partly, logically and/or physically from other network slices.

As described above, the network slice is the key feature of a next-generation network, which relates to transitioning static network modes which are suitable for all situations into a logical network partition mode with proper isolation, appropriate resources and optimized topology, such that the logic network partition may apply to the above different service types or single users. The network slicing technology allows partitioning the physical network into a plurality of virtual end-to-end networks. The network slice, which is logically isolated and comprises different service types with distinct characteristics and requirements and devices, access, transmissions and core networks, is applicable to.

FIG. 1 illustrates an example communication system 100 where embodiments of the present disclosure may be implemented. In this example, the communication system 100 comprises network devices 120-1, 120-2 and 120-3 (collectively referred to as "network device 120") and terminal devices 140-1 and 140-2 (collectively referred to as "terminal device 140"). The communication network 100 may also comprise a network controller 160 (not shown). The network device 120-1 supports the network slice 110 and the network slice 110 serves the terminal device 140. The network devices 120-1, 120-2 and 120-3 may communicate with each other. The network device 120 and the terminal device 140 may communicate. It should be appreciated that the network device 120 shown in FIG. 1 may be implemented at the base station and may also be implemented at a server of cloud service. The number of network devices, terminal devices and network slices shown in FIG. 1 are only for the purpose of illustrations and are not intended for restriction. The communication system may include any appropriate numbers of network devices, terminal devices and network slices.

The communication in the communication system 100 can employ by any appropriate communication technologies and a corresponding communication standard. An example of the communication technology includes, but is not limited to, Long Term Evolution (LTE), LTE-advanced (LTE-A), wideband code division multiple access (W-CDMA), code division multiple access (CDMA), a global system for mobile communication (GSM), orthogonal frequency division multiplexing (OFDM), wireless local area networks (WLAN), worldwide interoperability for microwave access (WiMAX), Bluetooth, Zigbee technology, machine type communication (MTC), D2D, M2M or the like. Moreover, the communication can be performed according to any appropriate communication protocols which includes, but is not limited to, a transmission control protocol (TCP)/internet protocol (IP), a hypertext transfer protocol (HTTP), a user datagram protocol (UDP), a session description protocol (SDP) and the like.

Geographical distributions of the terminal devices are usually uneven and the deployment situation of the services provided by the network devices is also nonuniform. Some rapidly moving terminal devices may accidentally enter an area which is uncovered by the services of the network device, which results in interruption of communication services. In some situations, when the terminal device is handed over from the source network device to the target network device, the communication services of the terminal device may also be interrupted due to insufficient amount of resources prepared by the target network device. In addition, in the traditional solution, when the target network device does not support the network slices used by the terminal device, the terminal device may be mapped to the network slices supported by the target network device. However, the above method may have problems, such as compatibility between different service providers. Moreover, the mapping procedure may be time-consuming, so the terminal device cannot be handed over to the target network device in time, which may cause interruptions of communication services.

In order to better guarantee quality of the communication services, embodiments of the present disclosure provide information of required amount of which is transmitted from the source network device to the target network device, which guarantee the continuity of the communication services of the terminal device. It should be understood that the resources in the communication network can be processing resources or storage resources as well. The resources in the communication network may also be time-frequency resources and the like. The resources in the communication network may also be any combinations of the above resources.

It is noted that the terms "first network device" and "second network device" used hereinafter are only for the purpose of illustrations rather than limitations. For example, if the network device 120-1 currently serves the terminal device 140, that is, the network device 120-1 is the source network device, the network device 120-1 can be referred to as the first network device. Instead of currently serving the terminal device 140, if the network device 120-1 may serve the terminal device 140 in the future, that is, the network device 120-1 is the target network device, the network device 120-1 can be referred to as second network device.

Figure 2:
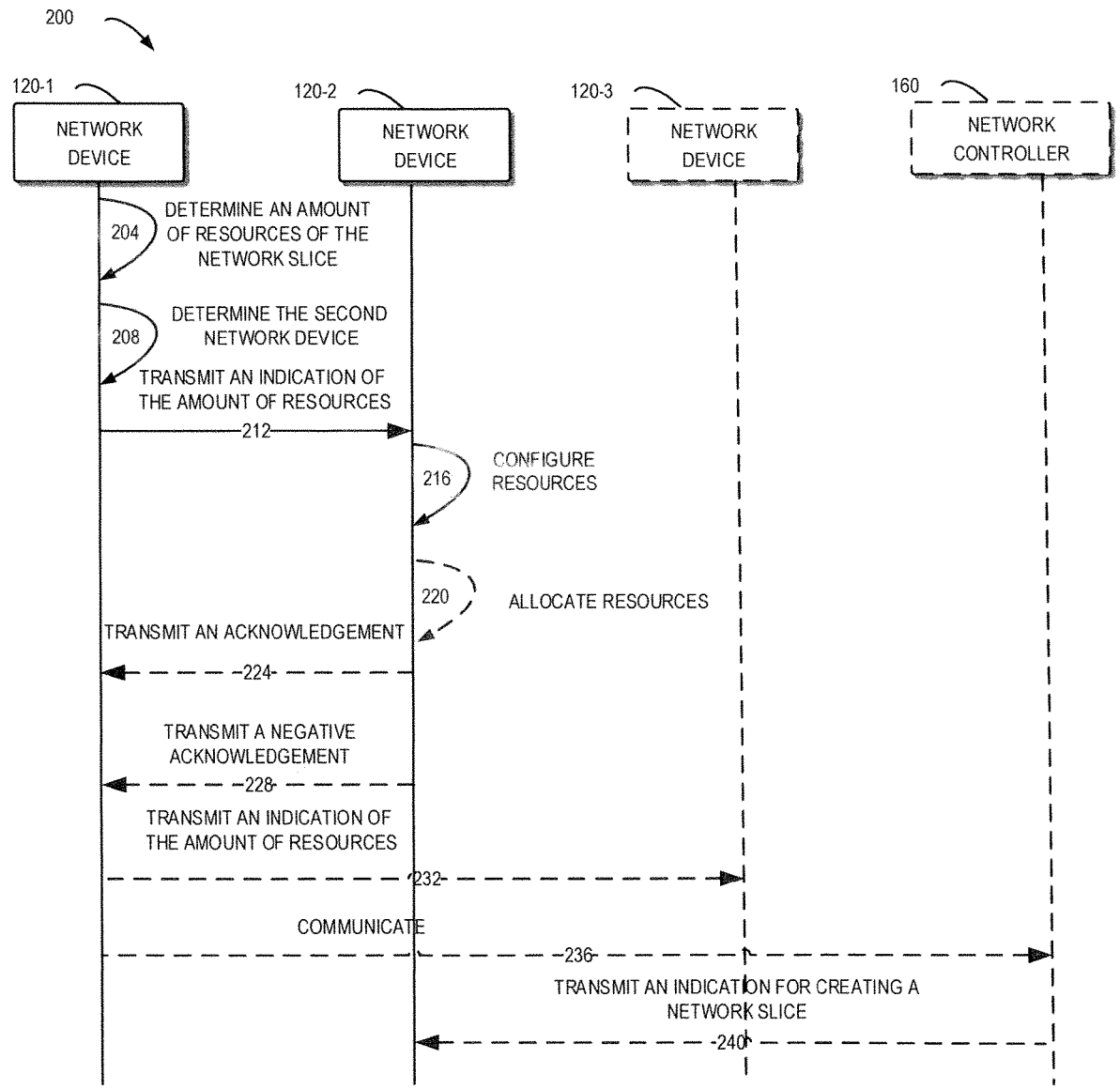
FIG. 2 illustrates an interaction diagram of communications according to some embodiments of the present disclosure.

FIG. 2 illustrates a diagram of interaction signaling 200 between the communication entities according to embodiments of the present disclosure. The terminal device 140 may be located within the service coverage of the network device 120-1 (that is, "the first network device"). The network device 120-1 may serve the terminal device 140 using the resources of the network slice 110. Interaction shown in FIG. 2 may be triggered by the terminal device 140. For example, the terminal device 140 may trigger the interaction shown in FIG. 2 by transmitting an indication that the terminal device 140 should be handed over to the network device 120-1. The interaction shown by FIG. 2 may also be triggered by the network device 120-1. For example, if the network device 120-1 may detect that the terminal device 140 is about to leave the service coverage of the network device 120-1 and the terminal device 140 needs to be handed over to a further network device (for example, the network device 120-1 or the network device 120-3), the network device 120-1 triggers the interaction shown in FIG. 2. In some embodiments, the network device 120-1 may detect a request of the terminal device 140 to services that consume a huge amount of resources. If the network device 120-1 determines that its own resources are not able to satisfy the service request of the terminal device 140, the network device 120-1 may trigger the interaction of FIG. 2.

The network device 120-1 determines 204 the amount of resources of the used network slices 110 based on the communication condition of its served terminal device 140. For example, the network device 120-1 can determine, based on the number of terminal devices 140 within its service coverage, the amount of resources of the used network slices 110. The network device 120-1 also may determine, through the service type needed by the terminal device 140, the amount of resources of the utilized network slices 110. The network device 120-1 may also determine the amount of resources of the utilized network slices 110 based the traffic of the service needed by the terminal device 140.

The network device 120-1 determines 208, in accordance with the movement of the terminal device 140, a further network device (that is, "the second network device") which will serve the terminal device 140. As an example only, the network device 120-1 may determine, based on the movement direction of the terminal device 140, the network device 120-2 and/or network device 120-3 to be the further network device which is about to serve the terminal device 140 with reference to FIG. 1. It should be appreciated that the network device 120-2 may act as the second network device as shown in FIG. 2 only for the purpose of illustrations. The network device 120-1 determines 208, based on the service request of the terminal device 140, a further network device which will serve the terminal device 140. For example, if the terminal device 140 requests a service which consumes a large amount of resources (for example, a live football match), the network device 120-1 can determine, based on the request, a further network device which will serve the terminal device 140.

Figure 3:
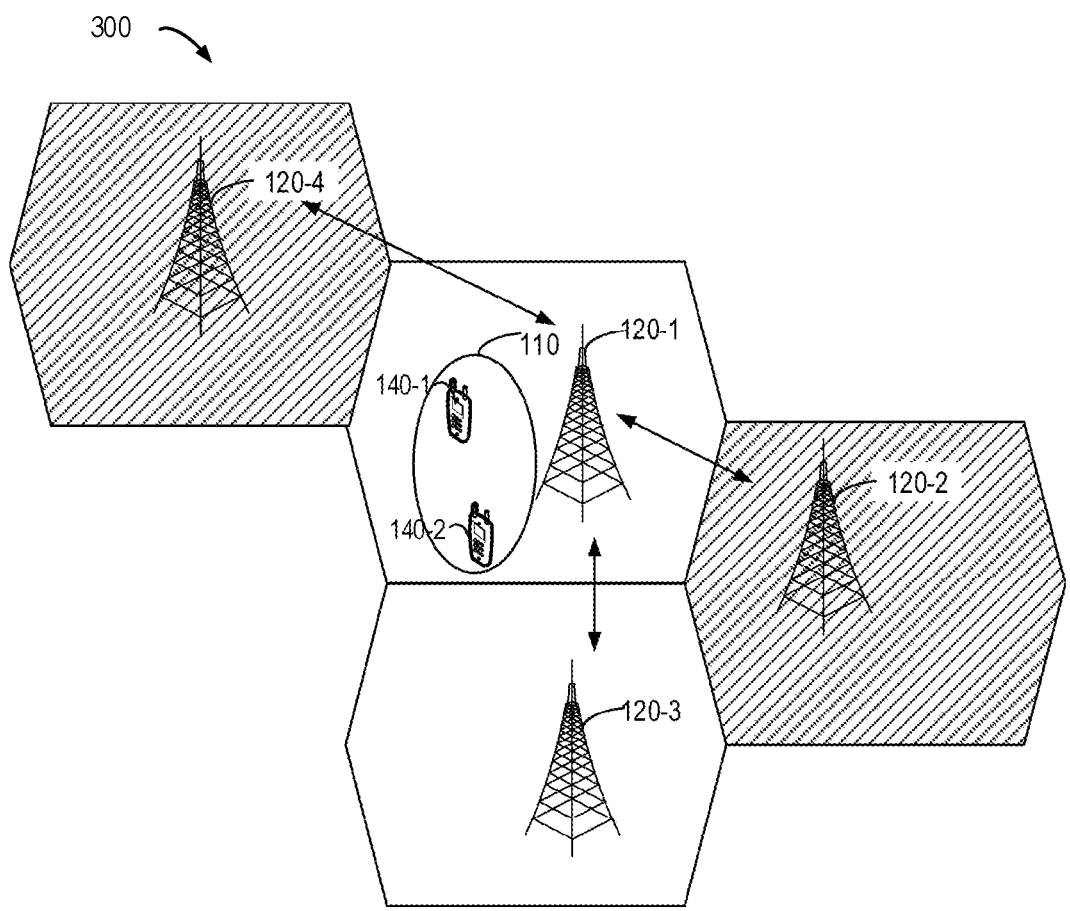
FIG. 3 illustrates a block diagram of an example communication system where embodiments of the present disclosure can be implemented.

In some embodiments, the network device 120-1 can determine a set of network devices which will serve the terminal device 140. With reference to FIG. 3, the network device 120-2 and the network device 120-4 can be determined as a set of network devices which will serve the terminal device 140. It should be appreciated that the network device 120-2 and the network device 120-3 are only examples. In the example embodiments, a set of network devices may be determined based on the movement direction of the terminal device 140. For example, the set of network devices may be network devices along the movement direction of the terminal device 140, and the set of network devices may also be network devices in front of the movement direction of the terminal device 140. In a further embodiment, a set of network devices may be determined based on data traffic of the terminal device 140. In other embodiments, a set of network devices may be determined based on the service type desired by the terminal device 140.

It should be noted that the set of network devices may comprise any number of network devices 120. The number may be preconfigured to the network device 120-1. The number may also be preconfigured to the terminal device 140 and transmitted to the network device 120-1 by the terminal device 140. The number may also be preconfigured into the network controller 160. The number may also be pre-stored in a storage apparatus accessible by the network device 120.

In some embodiments, the number of network devices in the set of network devices can be dynamically determined. For example, the number can be determined by the network device 120-1. The number may also be determined by the terminal device 140. The number may be determined by the network controller 160 as well.

Besides, the location of each network device in a group of network devices can be preconfigured in a similar fashion, and may also be dynamically determined by means of any currently known or to be developed positioning technologies, or reported by a user. For example, the location of each network device in a group of network devices may be determined by the network device 120-1. In example embodiments, the location of each network device in a group of network devices can be determined by the terminal device 140. In a further example embodiment, the location of each network device in a group of network devices can be determined by the network controller.

The network device 120-1 transmits 212 to the network device 120-2 an indication of amount of resources of the used network slices 110. For example, in some embodiments, the network device 120-1 may send to the network device 120-2 the amount of resources of the utilized network slices 110. In some embodiments, the network device 120-1 may also send a notification to the network device 120-2, such that the network device 120-2 configures the resources or prepares the resources. The example procedure of resource configuration by the network device 120-2 will be further described in the following text.

The network device 120-1 may communicate with the network device 120-2 in any suitable ways to send the indication of the amount of resources. For example, the network device 120-1 can communicate with the network device 120-2 wirelessly or through optic fibers. In this way, the network device which will serve the terminal device can determine its amount of resources to be configured, which can effectively avoid handover failure of the terminal device 140 due to insufficient configured resources.

In some embodiments, the network device 120-1 may transmit 212 to the set of network devices (such as network devices 120-2 and 120-4) an indication of the amount of resources of the utilized network slices 110. Only as an example, the network devices 120-2 and 120-4 are a group of network devices which will serve the terminal device 140 as shown in FIG. 3. The network device 120-1 may transmit an indication of amount of resources of the network slices 110 to any of the network devices 120-2 and 120-4. The network device 120-1 may also transmit an indication of amount of resources of the network slices 110 to both the network device 120-2 and the network device 120-4. In this way, even if the terminal device 140 moves fast, the success rate of the handover of the terminal device 140 is improved because a plurality of network devices which may possibly serve the terminal device 140 is notified in advance.

Now return to FIG. 2. The network device 120-2 configure 216s, based on the indication of the amount of resources sent 212 by the network device 120-1, the amount of resources of the used network slices 110. Only as an example, in some embodiments, the network device 120-2 may detect the current amount of resources available for the network slice 110. If the network device 120-2 determines that the current resources available for the network slice 110 satisfy the amount of resources in the indication, the network device 120-2 can transmit 224 to the network device 120-1 an acknowledgement to the indication, such that the network device 120-1 may determine that the terminal device 140 can be handed over to the network device 120-2. That is, the network device 120-1 can select the network device 120-2 for the handover of the terminal device 140.

In some other embodiments, if the network device 120-2 may determine that the current resources available for the network slice 110 do not satisfy the amount of resources in the indication, the network device 120-2 can allocate 220 resources of other network slices to the network slice 110. If the network device 120-2 determines that the reallocated resources of the network slice 110 satisfy the amount of resources in the indication, the network device 120-2 can transmit 224 to the network device 120-1 an acknowledgement to the indication, such that the network device 120-1 can determine that the terminal device 140 can be handed over to the network device 120-2.

If the network device 120-2 determines that the reallocated resources of the network slice 110 still fail to satisfy the amount of resources in the indication, the network device 120-2 can transmit 228 to the network device 120-1 a negative acknowledgement to the indication, such that the network device 120-1 may determine that the terminal device 140 cannot be handed over to the network device 120-2. In some embodiments, if the network device 120-2 determines that the current resources available for the network slice 110 fail to satisfy the amount of resources in the indication, the network device 120-2 can directly transmit 228 to the network device 120-1 a negative acknowledgement to the indication without reallocating the resources.

In some embodiments, if the network device 120-1 receives a negative acknowledgement from the network device 120-2, the network device 120-1 can transmit to the network device 120-3 (referred to as "the third network device") an indication of amount of resources. In example embodiments, the network device 120-3 can be determined based on the movement direction of the terminal device 140. In some further embodiments, the network device 120-3 may be one of a set of network devices determined by the network device 120-1.

It should be noted that although not shown, the network device 120-3 can configure, based on the indication of the amount of resources sent 232 by the network device 120-1, the amount of resources of the used network slices 110. If the network device 120-3 determines that the current resources available for the network slice 110 satisfy the amount of resources in the indication, the network device 120-3 can transmit to the network device 120-1 an acknowledgement to the indication, such that the network device 120-1 can determine that the terminal device 140 can be handed over to the network device 120-3. If the network device 120-3 determines that the current resources available for the network slice 110 fail to satisfy the amount of resources in the indication, the network device 120-3 can transmit to the network device 120-1 a negative acknowledgement to the indication. The network device 120-3 may also reconfigure the resources, such that the resources available for the network slice 110 satisfy the amount of resources in the indication and an acknowledgement to the indication is subsequently transmitted to the network device 120-1.

In some embodiments, if the network device 120-2 does not support the network slice 110, the network device 120-1 may communicate with the network controller 160 to facilitate the network controller 160 to transmit an indication for creating a network slice 110 to the network device 120-2. The network device 120-1 can determine, from the measurement report of the terminal device 140, that the network device 120-2 does not support the network slice 110. The network device 120-1 may also determine, based on the network configuration information, that the network device 120-2 does not support the network slice 110. For example, the network device 120-2, if located in a Tracking Area (TA) different from the network device 120-1, may not support the network slice 110.

The term "tracking area" used herein is used for managing the location of the terminal device in a Long-Term Evolution (LTE)/System Architecture Evolution (SAE) system. TA is defined as a free movement area where the terminal device does not require an update service. TA function implements the management of the terminal location, which can be split into paging management and location update management. The terminal device registers and notifies an Evolved Packet Core (EPC) of its own TA via the tracking area. TA is a cell-level configuration. Multiple cells can configure the same TA and one cell can belong to one TA only.

Figure 4:
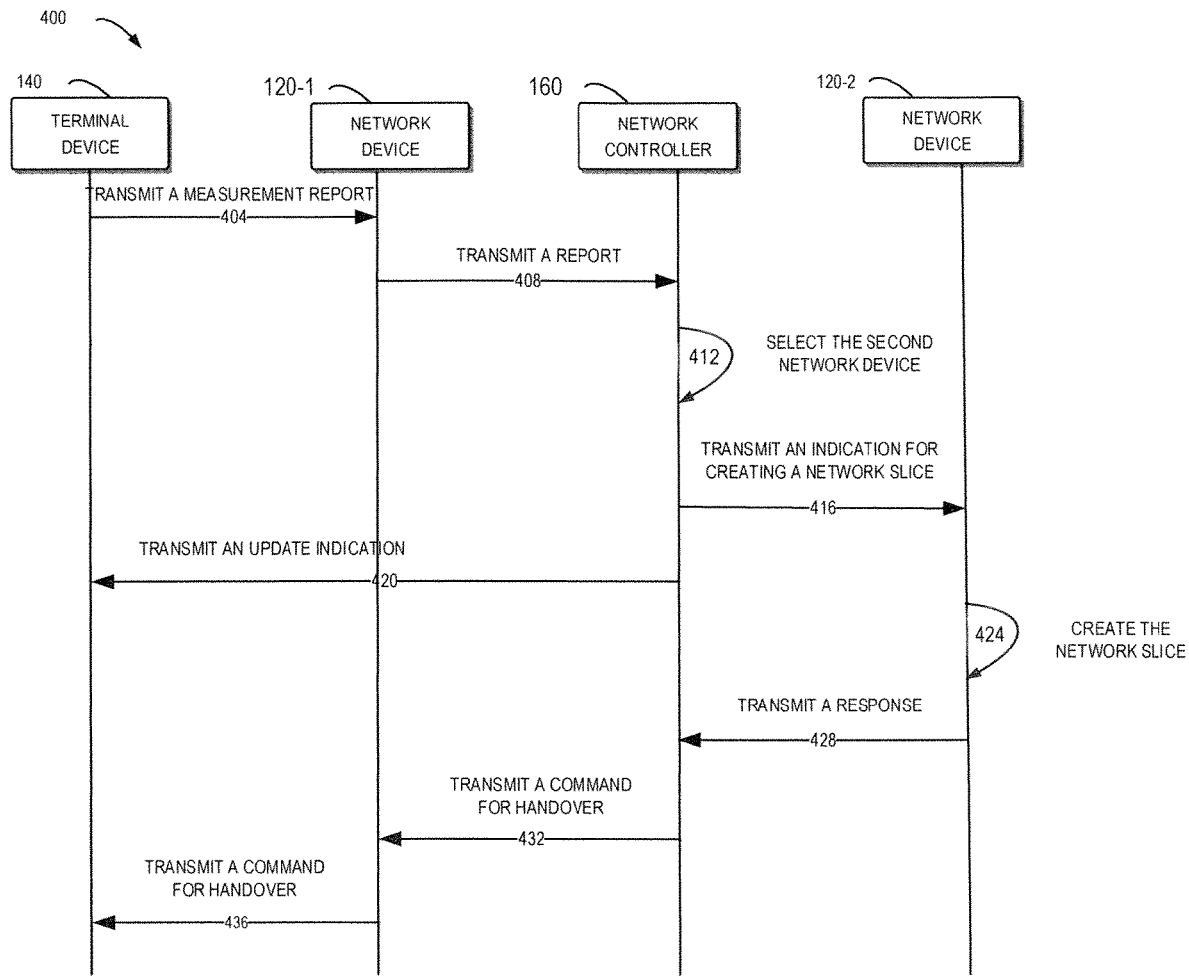
FIG. 4 illustrates an interaction diagram of communications according to some embodiments of the present disclosure.

Only as an example, FIG. 4 illustrates a diagram of interaction signaling 400 between communication entities which are provided for creating a network slice 110 on the network device 120-2 according to embodiments of the present disclosure. It can be appreciated that the interaction procedure shown in FIG. 4 is only example. The interaction 400 shown in FIG. 4 is an example implementation of 240 shown in FIG. 2.

The terminal device 140 transmits 404 to the network device 120-1 a measurement report, which may indicate that the terminal device 140 is about to leave the TA1 area where the network device 120-1 is located and enter the TA area. The measurement report may also indicate that the network device in the TA2 area does not support the network slice 110. In some embodiments, the network device 120-1 may determine, based on the measurement report and the network configuration information, that the network device in the TA2 area does not support the network slice 110.

The network device 120-1 transmits 408 to the associated network controller 160 a report to notify the network controller 160 that the TA2 area lacks a network device which supports the network slice 110. In some embodiments, the network controller 160 may select the network device 120-2 in the TA2 area. In some embodiments, the network device 120-1 may select the network device 120-2 in the TA2 area and notify the network controller 160 of the selected network device 120-2. The network device 120-2 may be determined based on the movement direction of the terminal device 140. The network device 120-2 may also be determined based on data traffic of the terminal device 140. The network device 120-2 may further be determined based on the service type needed by the terminal device 140.

The network controller 160 transmits 416 to the network device 120-2 an indication for creating a network slice 110.

The network controller 160 transmit 420 a TA update indication to the terminal device 140. In some embodiments, the network controller can transmit 420 to the terminal device 140 a TA update indication via a Non-Access Stratum (NAS) signaling.

The network device 120-2 can create 424 a network slice 110 thereon and transmit 428 to the network controller 160 a response to notify the network controller 160 of the creation of the network slice 110. The network controller 160 may communicate with the network device 120-1 to notify that the network device 120-1 can perform handover with the network device 120-2. The network device 120-1 can transmit to the terminal device 140 a handover command. In some embodiments, the network device 120-1 can transmit to the terminal device 140 a handover command via Radio Resource Control (RRC) signaling.

In this way, compatibility issues in the conventional technologies are avoided. Meanwhile, it may also prevent such problem that the terminal device may not be handed over in time to the target network device due to the time-consuming mapping procedure, resulting in interruptions of communication service.

Figure 5:
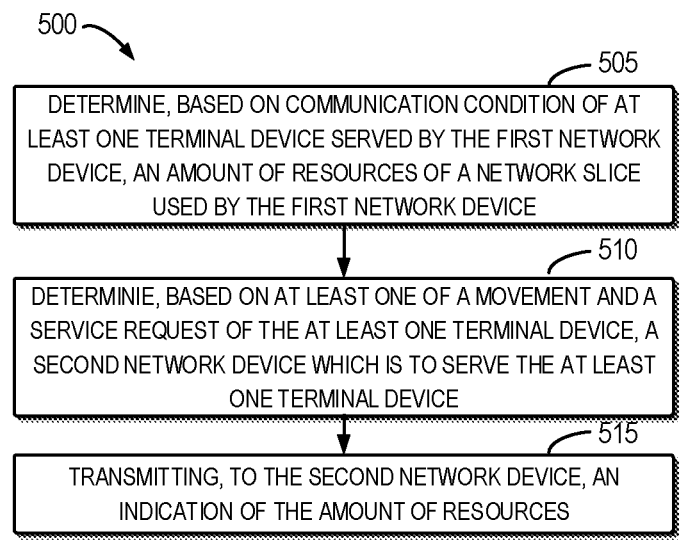
FIG. 5 illustrates a flowchart of an example method according to some embodiments of the present disclosure.

FIG. 5 illustrates a flowchart of an example method 500 according to some embodiments of the present disclosure. The method 500 can be implemented at the network device 120 shown by FIG. 1.

At block 505, the network device 120-1 determines, based on the communication condition of the terminal device 140 served by the network device 120-1, the amount of resources of the network slices 110 used by the network device 120-1.

At block 510, the network device 120-1 may determine, based on at least one of movement situation and service request of the terminal device 140, a further network device 120-2 which will serve the terminal device 140. In some embodiments, the network device 120-1 may determine the network device 120-2 in accordance with the movement direction of the terminal device 140. In some other embodiments, the network device 120-1 may determine a set of network devices (such as, the network devices 120-2 and 120-4) according to the moving direction of the terminal device 140.

At block 515, the network device 120-1 transmits to the network device 120-2 an indication of the amount of resources. In some embodiments, the network device 120-1 can transmit to the network device 120-2 a notification, such that the network device 120-2 may configure resources based on the amount of resources.

In example embodiments, the method 500 may also comprise: the network device 120-1 receives from the network device 120-2 an acknowledgement to the indication and selects the network device 120-2 for handing over the terminal device 140. The acknowledgement indicates that the network device 120-2 is able to satisfy the amount of resources.

In another example embodiment, the method 500 may also comprise: the network device 120-1 receives from the network device 120-2 a negative acknowledgement to the indication and determines, based on the movement of the terminal device 140, the network device 120-3 which will serve the terminal device 140. The negative acknowledgement indicates that the network device 120-2 is not able to satisfy the amount of resources. In some embodiments, the method 500 may further comprise: the network device 120-1 may transmit the above indication to the network device 120-3.

In a further example embodiment, the method 500 may also include: if the network device 120-2 does not support the network slice 110, the network device 120-1 can communicate with the network controller 160, to trigger the network controller 160 to transmit an indication for creating the network slice 110 to the network device 120-2.

Figure 6:
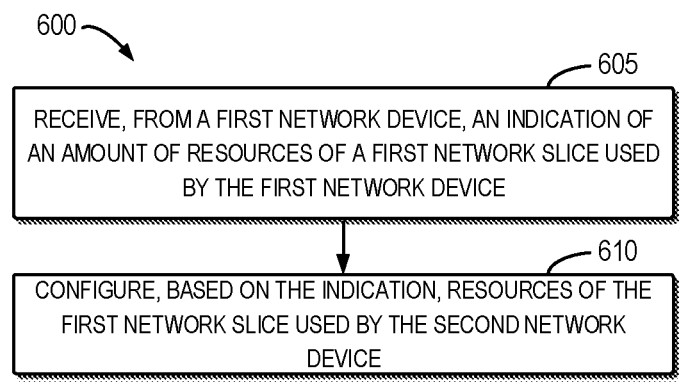
FIG. 6 illustrates a flowchart of an example method according to some embodiments of the present disclosure.

FIG. 6 illustrates a flowchart of an example method 600 according to some embodiments of the present disclosure. The method 600 may be implemented at the network device 120 shown in FIG. 1.

At block 605, the network device 120-2 receives from the network device 120-1 an indication of the amount of resources of the network slices 110 used by the network device 120-1.

At block 610, the network device 120-2 configures the resources of the network slices 110 used by the network device 120-2 based on the indication.

In example embodiments, the method 600 also comprises: if the network device 120-2 can satisfy the above amount of resources, it may transmit an acknowledgement to the indication to the network device 120-1.

In another example embodiment, the method 600 also comprises: if the network device 120-2 cannot satisfy the above amount of resources, the network device 120-2 can allocate the resources of other network slices to the network slice 110.

In a further example embodiment, the method 600 further comprises: if the network device 120-2 cannot satisfy the above amount of resources, the network device 120-2 sends to the network device 120-1 a negative acknowledgement to the indication.

In some embodiments, the method 600 further comprises: if the network device 120-2 does not support the network slice 110, the network device 120-2 can receive from the network controller 160 associated with the network device 120-1 an indication for creating a network slice 110.

Figure 7:
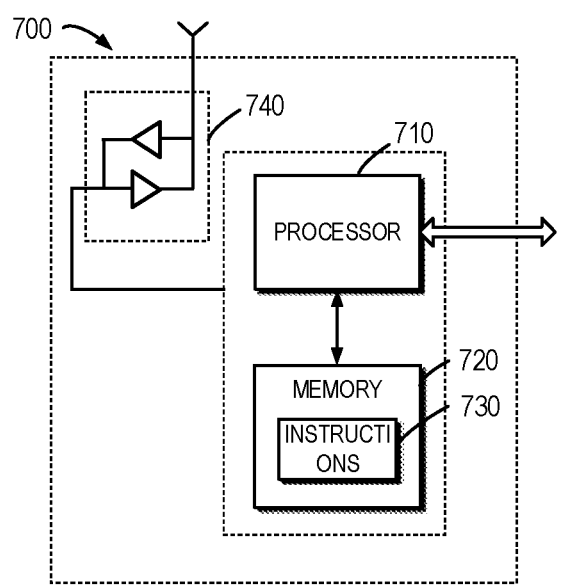
FIG. 7 illustrates a block diagram of a communication device according to some embodiments of the present disclosure.

FIG. 7 illustrates a block diagram of a device 700 according to embodiments of the present disclosure. As shown in FIG. 7, the device 700 includes one or more processors 710, one or more memories 720 coupled to the processors 710, and one or more transmitters and/or receivers 740 coupled to the processors 740.

The processor 710 can be of any appropriate type applicable to the local technical environment, and for example, and without limitation, the processor 710 may include, but is not limited to, one or more general computers, dedicated computers, microprocessors, digital signal processors and processors based on multi-core processor architecture. The device 700 can include a plurality of processors, such as specific integrated circuit chips, which are temporally synchronous with the main processor.

The memory 720 can be of any appropriate type applicable to the local technical environment and can be implemented using any appropriate data storage technology, which includes, but is not limited to a non-transitory computer readable medium, a semiconductor-based storage device, magnetic storage device and system, and storage device and system.

The memory 720 stores at least a part of instructions 730. The transmitter/receiver 740 is applicable to bidirectional communication. The transmitter/receiver 740 includes at least one antenna for communication and can support optical fiber communication, but there may be several access nodes as mentioned in the present disclosure, in practice. The communication interface can represent any essential interface for communication with other network elements.

The instruction 730 is assumed to include a program instruction, when executed by the associated processor 710 causing the device 700 to perform operations according to the embodiments of the present disclosure as described with reference to FIG. 2 and FIG. 6. That is, the embodiments of the present disclosure can be implemented by the processor 710 of the device 700 performed by computer software, or hardware, or a combination of software and hardware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

For example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of divide embodiments may also be implemented in combination in a single embodiment. Conversely, various features that are described in the context of a single embodiment may also be implemented in multiple embodiments dividedly or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

We claim:

1. A communication method implemented at a first network device, comprising:
   receiving from a terminal device served by the first network device a measurement report indicating that the terminal device is about to leave a first tracking area where the first network device is located and enter a second tracking area, and indicating that a second network device in the second tracking area does not support a currently used network slice,
   determining, based on a communication condition of the terminal device, an amount of resources of the currently used network slice, the currently used network slice being associated with a set of network functions;
   determining, based on at least one of a movement and a service request of the terminal device, the second network device which is to serve the terminal device;
   transmitting, to the second network device, an indication of the amount of resources;
   in response to receiving, from the second network device, an acknowledgment to the indication, selecting, by the first network device, the second network device for handover of the terminal device, the acknowledgment indicating that the second network device is capable of satisfying the amount of resources;
   in response to receiving from the second network device a negative acknowledgement to the indication, determining, by the first network device, based on the movement of the terminal device, a third network device which is to serve the terminal device, the negative acknowledgement indicating that the second network device fails to satisfy the amount of resources, and transmitting the indication to the third network device; and
   in response to determining that the second network device fails to support the currently used network slice, the first network device communicating with a network controller associated with the first network device to trigger the network controller to transmit an indication for creating the currently used network slice to the second network device, and to transmit a tracking area update to the terminal device, and receive from the network controller a notification to perform handover with the second network device, the first network device further transmitting a handover command to the terminal device.

2. The method of claim 1, wherein the second network device is selected from a set of network devices which are determined based on a moving direction of the terminal device.

3. The method of claim 1, wherein transmitting, to the second network device, an indication of the amount of resources comprises:
- transmitting a notification to the second network device, such that the second network device configures resources based on the amount of resources.

4. A non-transitory computer readable medium storing instructions thereon, the instructions, when executed by at least one processing unit of a machine, causing the machine to perform the method according to claim 1.

* * * * *